United States Patent [19]

Hicks et al.

[11] 3,794,775

[45] Feb. 26, 1974

[54] DIGITAL IMPULSE CORRECTOR FOR TELECOMMUNICATION CIRCUITRY

[75] Inventors: Percy W. Hicks; Michael R. Gale, both of Winnipeg, Manitoba, Canada

[73] Assignee: A.E.I. Telecommunications (Canada) Limited, Manitoba, Canada

[22] Filed: July 29, 1971

[21] Appl. No.: 167,111

[30] Foreign Application Priority Data

Aug. 3, 1970 Great Britain................37316/70

[52] U.S. Cl............................ 179/16 EA, 328/164

[51] Int. Cl......................................... H04q 1/36

[58] Field of Search 179/16 A, 16 AA, 16 E, 16 EA, 179/16 F, 16 EC; 328/164; 178/70 R, 70 T, 70 TS

[56] References Cited

UNITED STATES PATENTS

| | | | |
|---|---|---|---|
| 3,700,821 | 10/1972 | Savage | 179/16 E |
| 3,452,220 | 6/1969 | Fritschi | 179/16 E |
| 3,544,724 | 12/1970 | Pento | 179/16 E |
| 3,504,290 | 3/1970 | Earle | 179/85 |
| 3,450,843 | 6/1969 | Fritschi | 179/16 E |
| 3,312,784 | 4/1967 | Draper, Jr. | 179/16 E |

*Primary Examiner*—Kathleen H. Claffy

*Assistant Examiner*—Randall P. Myers

*Attorney, Agent, or Firm*—Cecil C. Kent & Associates

[57] ABSTRACT

An add-on circuit automatically adjusts or maintains the make and break ratios of telecommunication dial pulsing within limits, thus helping to eliminate many network and trunk line signalling problems.

5 Claims, 9 Drawing Figures

FIG. 1 FUNCTION SEQUENCES

INVENTOR.
Percy W Hicks, Michael R Gale

BY Kent & Dale

ADJUST VR2 CLOCKWISE TO INCREASE T OFF AND ANTI-CLOCKWISE TO DECREASE T OFF.

ADJUST VR1 CLOCKWISE TO INCREASE T ON AND ANTI-CLOCKWISE TO DECREASE T ON.

TO = OPERATE TIME
TR = RELEASE TIME

TF ADJUSTED TO EQUAL $\sim 50 + \frac{(TR - TO)}{2}$ mS.

TV ADJUSTED TO EQUAL $\sim 50 + (TR - TO)$ mS.

INVENTOR.
Percy W. Hicks, Michael R Gale
BY
[signature]

INVENTOR.
PERCY W. HICKS, MICHAEL R. GALE
BY Kent & Hale

DIGITAL IMPULSE CORRECTOR FOR TELECOMMUNICATION CIRCUITRY

BACKGROUND OF THE INVENTION

When dialing a telephone, the impulses generated control the switching which enables the correct connection to be made. Many factors may distort these impulses resulting in signalling problems such as wrong numbers, no connections, and the like. Such factors include line characteristics, relay characteristics, and any high resistance or partial shorts which may occur in the transmission facilities between the originating and receiving ends. Also when dealing with overland wires such as on rural telephone lines, these wires occassionally slap together due to weather and the like, once again causing a distortion of the signal impulses.

SUMMARY OF THE INVENTION

The present invention relates to new and useful improvements in a method of converting impulses of a certain break ratio to impulses of the same rate but differing break ratio by use of digital means using two timing factors predetermined by the input rate and range of break ratios and output break ratio range required.

Where a range of input rates has to be contended with, the two timing factors are adjusted to give acceptable output ratios for all rates within the range and limits of the system.

One of the timing factors determines the minimum output break time while the other determines the range of input break times for which the minimum output break time remains unaffected. Any input break time outside of the range will produce either no output break time, or the output break time will be extended by the amount the input break time exceeds the given range.

For the purpose of this disclosure the circuit has been designed for inclusion in the "M" lead of a Trunk Line circuit.

In this application however a simple strapping modification can convert it for inclusion in the "E" lead of Trunk Line circuit. Also when required the circuit can be used with "Line-Loop" working with the addition of a high impedence loop detection circuit capable of 5000 ohm. Loop and 15,000 ohm. Leak discrimination.

The circuit has been designed as an add-on, requiring no modification to the existing trunk circuits. The only wiring required is of the supplies and the "M" or "E" lead.

With the foregoing in view, and such other or further purposes, advantages or novel features as may become apparent from consideration of this disclosure and specification, the present invention consists of, and is hereby claimed to reside in, the inventive concept which is comprised, embodied, embraced, or included in the method, process, construction, composition, arrangement or combination of parts, or new use of any of the foregoing, of which concept, one or more specific embodiments of same are herein exemplified as illustrative only of such concept.

DESCRIPTION OF THE DRAWINGS

In the drawings like characters of reference indicate corresponding parts in the different figures.

DETAILED DESCRIPTION

In the examples given, the circuit is designed to operate from an exchange battery of negative 50 volts (earthed positive) maintained between 46 and 52 volts.

The 50 volt battery is connected to terminal 13/A (see FIG. 8) and is fused at 0.5 amps while the 50 volt battery to terminal 16/C is fused at 1.5 amps as clearly indicated.

The circuitry is designed to operate between a range of temperatures from 0°C to 65°C.

The circuit has been designed to accept impulsing rates of from 8–12 I.P.S. The minimum break pulse, nominally 20mS, that the circuit will accept, will depend upon its initial set-up as outlined subsequently.

The nominal operating characteristics are as follows.

The following gives the theoretical values to be assigned to time factors TF and TV and used in calculating the compensation required. They do not give the actual settings of the associated monostables in the circuit which are set according to the instructions given subsequently under "Setting-up Procedures."

Let:

TBI = Input break pulse in milliseconds
TBO = Output break pulse in milliseconds
TF = Minimum time factor
TV = Maximum time factor
T(MIN) = Minimum input period time in milliseconds Then:

For $TF > TBI$, $TBO = 0$
For $TF < TBI \leq (TF + TV)$, $TBO = TV$
For $TBI > (TF + TV)$, $TBO = TV + x$
where $x = TBI - (TF + TV)$.
and
$T(MIN) > TF + TV$

NOTE:

T(MIN) is dependent on the initial time factors (and setting-up) specified for individual installations, and also on the maximum impulse speed of the output relay.

Figure 9:
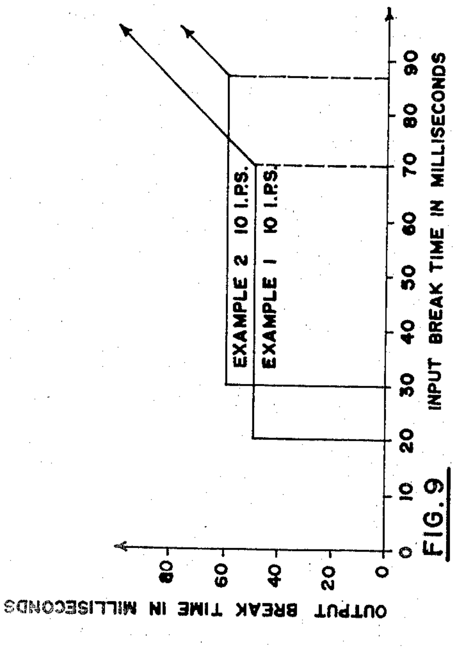
FIG. 9 is a graph of input/output characteristic for examples in the specification.

Example 1 (Refer to the graph of FIG. 9)

TBI = 20 – 80 percent
TBO required = 50 percent Rate = 10 I.P.S.

Then:

TF set to 20 milliseconds
TV set to 50 milliseconds
TBI (MAX) = 20 + 50
= 70 Milliseconds for a TBO of 50 mS.
Therefore for a TBI = 80 percent
TBO = 60 percent Example 2

Rate 8 – 12 I.P.S.
Nominal TBO at 10 I.P.S. = 58 percent
TBI (MIN) = 30 milliseconds Then:

TF set to 30 milliseconds
TV set to 58 milliseconds
TBI (Max) = 30 + 58
= 88 milliseconds for a TBO of 58 mS.

Generally, seizure, impulsing and disconnection are under the control of two monostables whose times are set for the optimim correction over the speeds and ratios of the input.

However with these settings a maximum rate of only 11.37 I.P.S. can be achieved, and a compromise would have to be made between the maximum impulse rate required and the minimum break time TBI (MIN).

The input is passed through a delay means and then via a trigger circuit to the digital control circuitry. The output of the digital control circuitry controls a relay, which acts as a buffer, which in turn produces the corrected "M" lead signalling conditions.

In the subsequent detailed description, the following definitions are used.

LOGIC 0 = Low voltage (−15 volts) (FALSE) level.

LOGIC 1 = High voltage (earth) (TRUE) level.

The negative nominal battery voltage of 50 volts is reduced to 15 volts via the series transistor T3 and resistor R8 under the control of zener diode D9. Filtering and transient suppression is accomplished with capacitors C5 and C8.

DELAY MEANS

Conditions on the "M" lead produced by the preceeding circuit are passed via resistor R1 and diode D1 to the base of transistor T1. Consider first that the "M" LEAD IN is open-circuit or is at earth potential. Transistor T1 will be conducting with its collector at logic 0 potential. On seizure of the circuit the "M" LEAD IN input will be taken negative via the resistance lamp in the preceeding circuit. Diodes D1 and D2 will conduct with D2 holding the voltage at the base of transistor T1 at approximately 0.4 volts negative with respect to its emitter. Under these conditions transistor T1 will be turned OFF. With the turn-off of transistor T1 its collector voltage will start to rise to the logic 1 level at a rate determined by the discharge of capacitor C2 through resistor R3 and trim potentiometer VR2. At a certain level the trigger circuit will respond to provide a change in logic level to the control circuit.

On removal of the negative battery signal on the "M" LEAD IN input, with a return to the previous conditions, diode D1 will cease conduction and diode D2 will become reverse biased. Capacitor C1 now commences to discharge at a rate determined by resistor R2 and trim potentiometer VR1 until a level is reached when transistor T1 will turn "ON" to produce a logic level 0 at its collector.

Capacitor C2 will be charged by transistor T1 turning "ON," and the trigger circuit will change its state.

It can thus be seen that for every change in the input signal condition, the effective output is delayed by a time determined by the discharge rates of capacitors C1 and C2.

Resistor R1 is provided to limit current taken by the circuit, while D1 provides protection against positive transient pulses which may be induced into the incoming "M" lead. Negative transient on the input will be absorbed by capacitor C1.

TRIGGER CIRCUIT

The trigger circuit consists of two NAND gates with resistors R4 and R5 which form a Schmitt trigger. With the input originally low, i.e., transistor T1 "ON," output 11 of IC4 (gate 1) will be high, which in turn causes the output 8 of IC4 (gate 2) to be low. As the input rises to the logic 1 level due to transistor T1 having turned "OFF," a point is reached where gate 1 turns "ON" sufficiently to cause gate 2 to begin to turn "OFF." Turn "OFF" of gate 2 feeds back to the input of gate 1 causing regenerative action and a rapid change of output level. The feedback through R5 and its action on R4 produces hysteresis in the circuit, to provide a sharp waveshape at the output without any transitory oscillations. For the resistors chosen the switching voltages are nominally 7.1 volts for a logical 1 output and 5.6 volts for a logic 0 output.

CONTROL CIRCUIT

On seizure, IC4-6 output is forced "true" due to IC2-11 output going "false." On receipt of the first break pulse or disconnection, the possible change of IC4-6 output is delayed by a time determined by monostable IC3-8 output. When the break pulse is shorter than the length of time IC3-8 output is false, then there will be no change in the status of IC4-6 output. If, however, the input break pulse is greater than the length of time IC3-8 output is false, the output IC4-6 will be forced false. Once IC4-6 output is false, it is held false for at least the duration the monostable IC3-6 output is false. If the duration of the input break pulse exceeds the combined pulse durations of monostables IC3-8 output and IC3-6 output, then the output IC4-6 will be held false for the duration that monostable IC3-6 is false plus the amount the input break exceeds the combined pulse durations of monostables IC3-8 output and IC3-6 output.

The pulse duration of monostable output IC3-8 may be adjusted using potentiometer VR3 while monostable output IC3-6 output is adjusted using potentiometer VR4. The setting of these potentiometers is given subsequently under "Setting-Up Procedure."

OUTPUT STAGE

The output stage provides the "M" LEAD OUT signalling from relay MO which is controlled by the operation of transistor T2.

When the IC4-6 output is false (i.e., −15 volts), diode D6 conducts and holds the base of transistor T2 at approximately −14 volts. Under this condition transistor T2 does not conduct and relay MO is not energised. With relay MO not energised a break condition (full — or resistive earth) is given on the "M" LEAD OUT.

If IC4-8 output becomes true (i.e., OV), diode D6 is reversed biased due to transistor T2 being allowed to turn "ON." Transistor T2 turning "ON" energises relay MO which operates and signals a seized condition on the "M" LEAD OUT using contact MO1.

Relay contacts MO1 and MO2 may be paralleled if required to improve the integrity of the circuit.

SETTING-UP PROCEDURE

The setting-up procedure will now be given and in this connection, the following equipment is required.

1. An oscilloscope, suitable for high speed electronic earth. with dual trace, and with common connected to earty.
2. Pulse signalling test set model TTS26B manufactured by Northeast Electronics Corporation or similar.
3. An impulse timer operable from a fleeting condition and with a 100 millisecond range.

NOTE:

To facilitate setting-up, the input impulsing should be obtained using a mercury wetted relay to eliminate contact bounce.

DELAY MEANS

Figure 1:
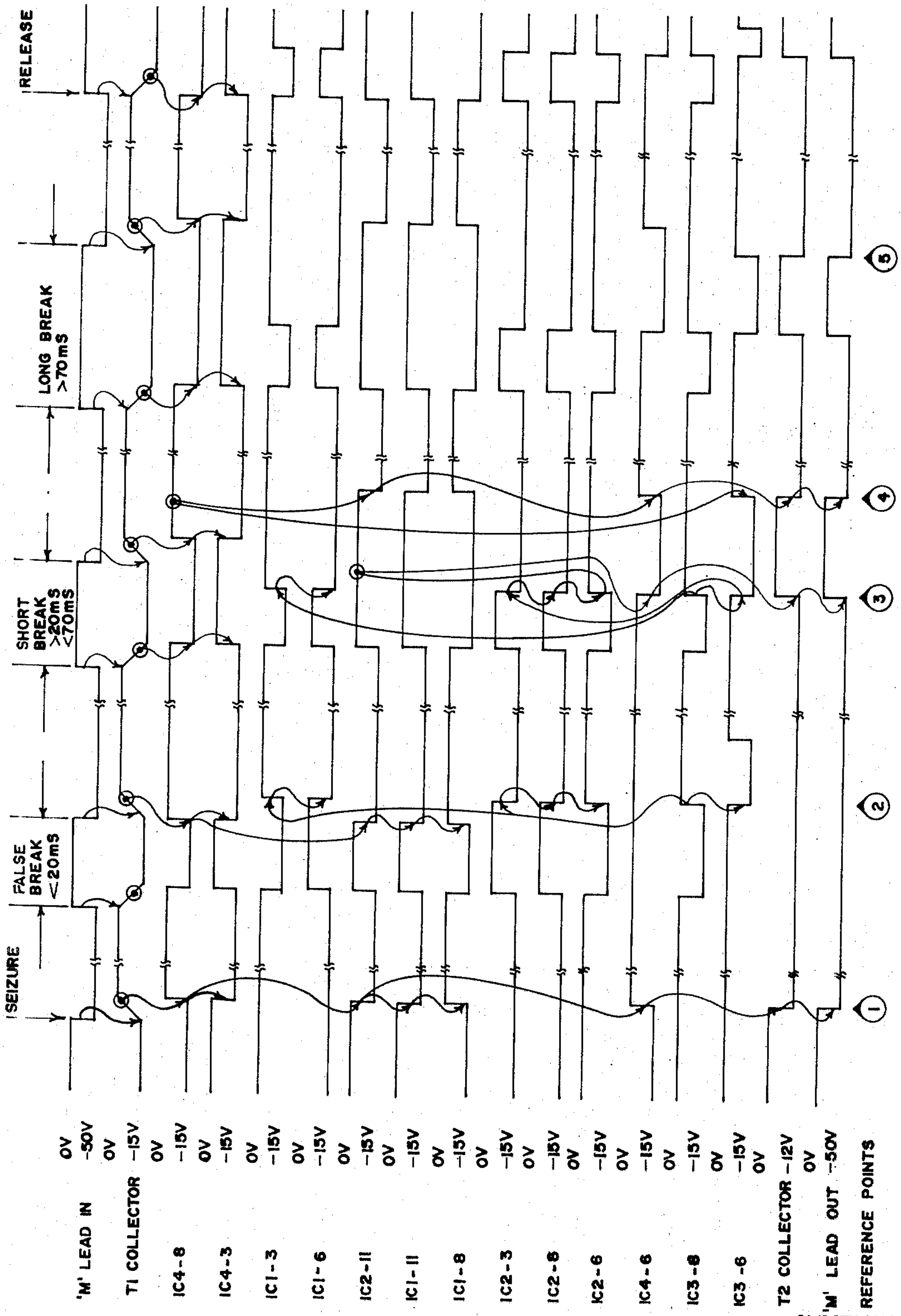
FIG. 1 is a schematic drawing of the function sequences.
Figure 2:
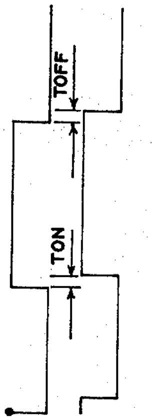
FIG. 2 to 7 inclusive show schematic views showing setting-up waveshapes for the corrector.

With the supplies connected to the circuit with the recommended fusing (see FIG. 8), apply to the "M" LEAD IN a signal, varying between earth and 2 Kilohm maximim resistive negative 50 volt battery, of rate 10 I.P.S. and break ratio of 50 percent. The oscilloscope probes for each trace are then connected with one to observe the "M" LEAD IN signal and the other to observe the IC4-3 output. Adjusting potentiometers VR1 and VR2 an oxcilloscope picture similar to FIG. 2 should be obtained.

Figure 3:
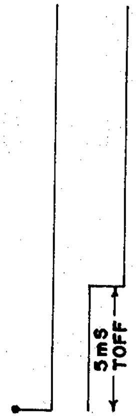
Figure 4:
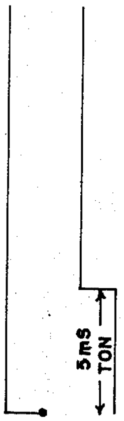
Figure 5:
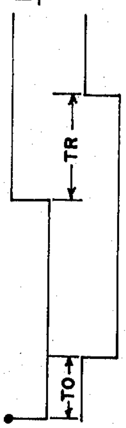

If the oscilloscope is triggered from the negative going edge of the "M" LEAD IN signal a picture similar to FIG. 3 may be obtained by suitable manipulation of the oscilloscope controls. Potentiometer VR2 may then be adjusted to obtain a T OFF time of 5 milliseconds. Triggering the oscilloscope from the positive going edge of the "M" LEAD IN signal will produce a picture similar to FIG. 4 and by adjustment of the VR1 the time T ON may be adjusted to 5 milliseconds.

OUTPUT RELAY

So far in the specification, the operate and release times of the output relay MO have been ignored. If the operate and release time of relay MO were identical then the only discrepancy in the break ratio would be due to the traverse time of the relays contacts. However, it is difficult to have a circuit with these ideal characteristics, and hence compensation must be applied to take into account differing operate and release times of relay MO. To this end the operate and release times of relay MO, for each circuit must be measured.

Figure 6:
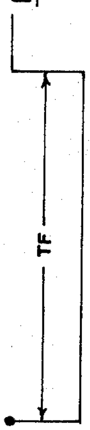

With "M" LEAD IN signal applied, connect one oscilloscope probe to monostable IC3-8 output. With the oscilloscope triggering off the negative going edge of the monostable IC3-8 output, the controls of the oscilloscope are adjusted to provide a picture similar to that shown in FIG. 6.

Potentiometer VR3 is now adjusted to produce a time TF which is obtained from the following equation:

$$TF = 20 - (TR - TO)/2 \text{ milliseconds}$$

where

TF = Time constant of monostable IC3-8 output in milliseconds

TR = Release time of relay MO in milliseconds

TO = Operate time of relay MO in milliseconds

Figure 7:
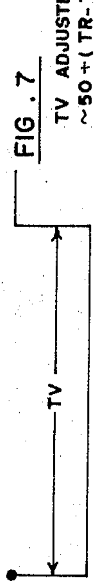

Similarly monostable IC3-6 output is adjusted with the oscilloscope probe connected to monostable IC3-6 output, and a waveshape similar to that shown in FIG. 7 obtained. Potentiometer VR4 is then adjusted to provide a time TV which is obtained from the following equation:

$$TV = 50 + (TR - TO) \text{ Milliseconds}$$

where

TV = Time constant of monostable IC3-6 output in milliseconds

TR = Release time of relay MO in milliseconds

TO = Operate time of relay MO in milliseconds

The above formula for time constants TF and TV compensate for the operate and release times of relay MO in order to provide for the minimum TBI of 20 milliseconds and the minimum output break time of 50 milliseconds specified in Example 1.

Figure 8:
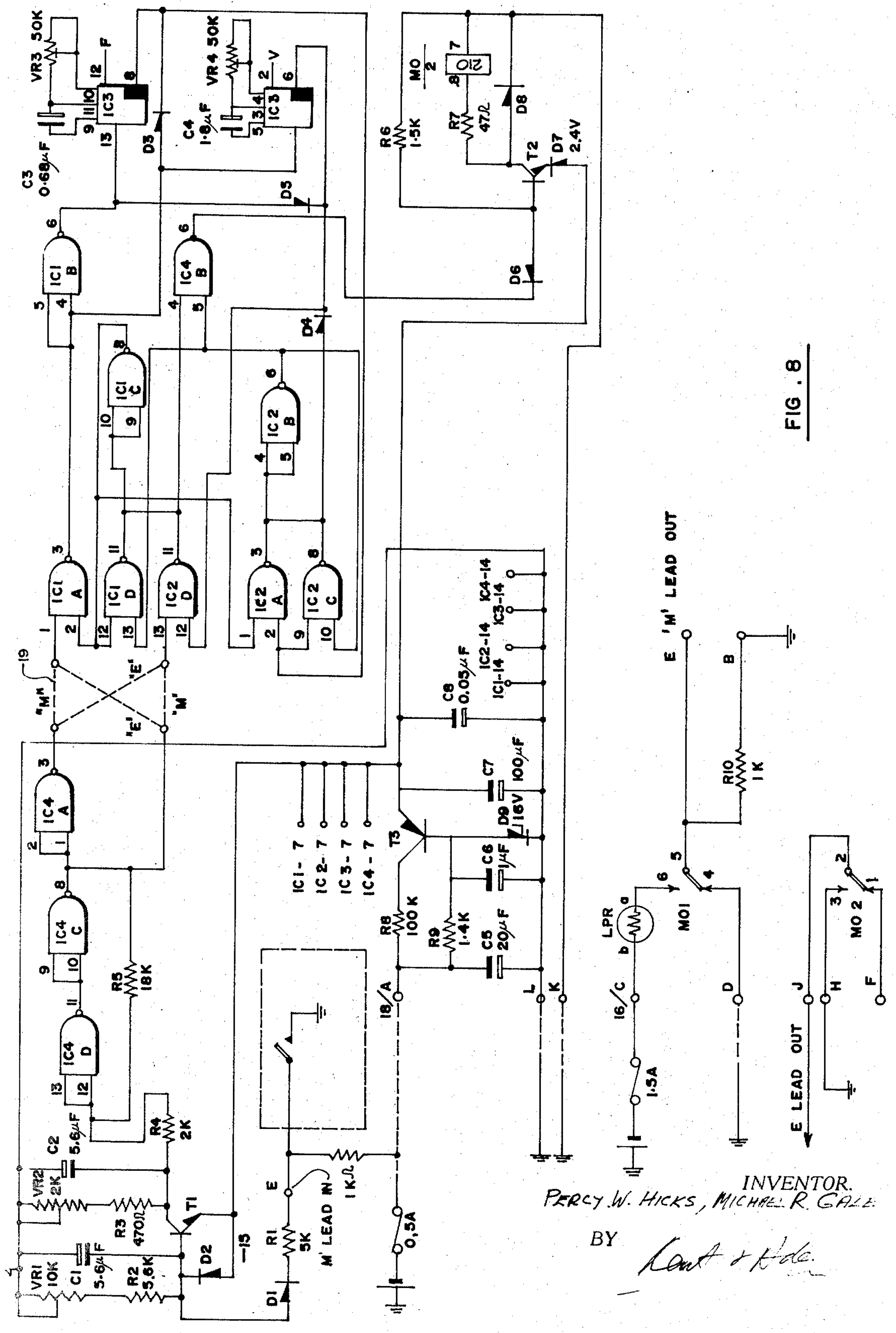
FIG. 8 is a schematic wiring diagram of the digital impulse corrector.

Reference character 19 of FIG. 8 shows the aforementioned strapping circuit which may be utilized to enable the circuitry to be used on "M" or "E" leads.

For insertion in the "M" lead, straps "M" are used and straps "E" are removed.

By the same token for insertion in the "E" lead, straps "E" are inserted and straps "M" are omitted.

Various modifications can be made within the scope of the inventive concept disclosed and/or claimed.

What is claimed to be the present invention is:

1. A digital impulse corrector comprising digital integrated circuit logic control means, including first and second adjustable timers, for comparing the duration of a pulse in an input pulse train with the preset period of said first adjustable timer and for controlling a discrete transistor means so as to produce an output pulse having a duration substantially equal to or greater than a preset period of said second adjustable timer when the duration of the input pulse is equal to or greater than the preset period of the first adjustable timer, each of said timers comprising a monostable circuit.

2. A digital impulse corrector according to claim 1 wherein, when the duration of the input pulse is equal to or greater than the sum of the two said preset periods, the duration of the output pulse is equal to the duration of the preset period of the second adjustable timer plus the amount by which the duration of the input pulse exceeds the sum of the two preset periods.

3. A digital impulse corrector according to claim 1 wherein the period of each said adjustable timer is set by means of a potentiometer.

4. A digital impulse corrector according to claim 3 further comprising a relay connected to the output of said logic control means and operable by the said output pulse to produce corrector output.

5. A digital impulse corrector according to claim 1 further comprising a delay means for receiving said input pulse train, a trigger circuit connected to the output of said delay means and connected to the input of said logic control means and a buffer relay connected to the output of said logic control means for producing corrected output pulses.

* * * * *